United States Patent Office 3,181,554
Patented May 4, 1965

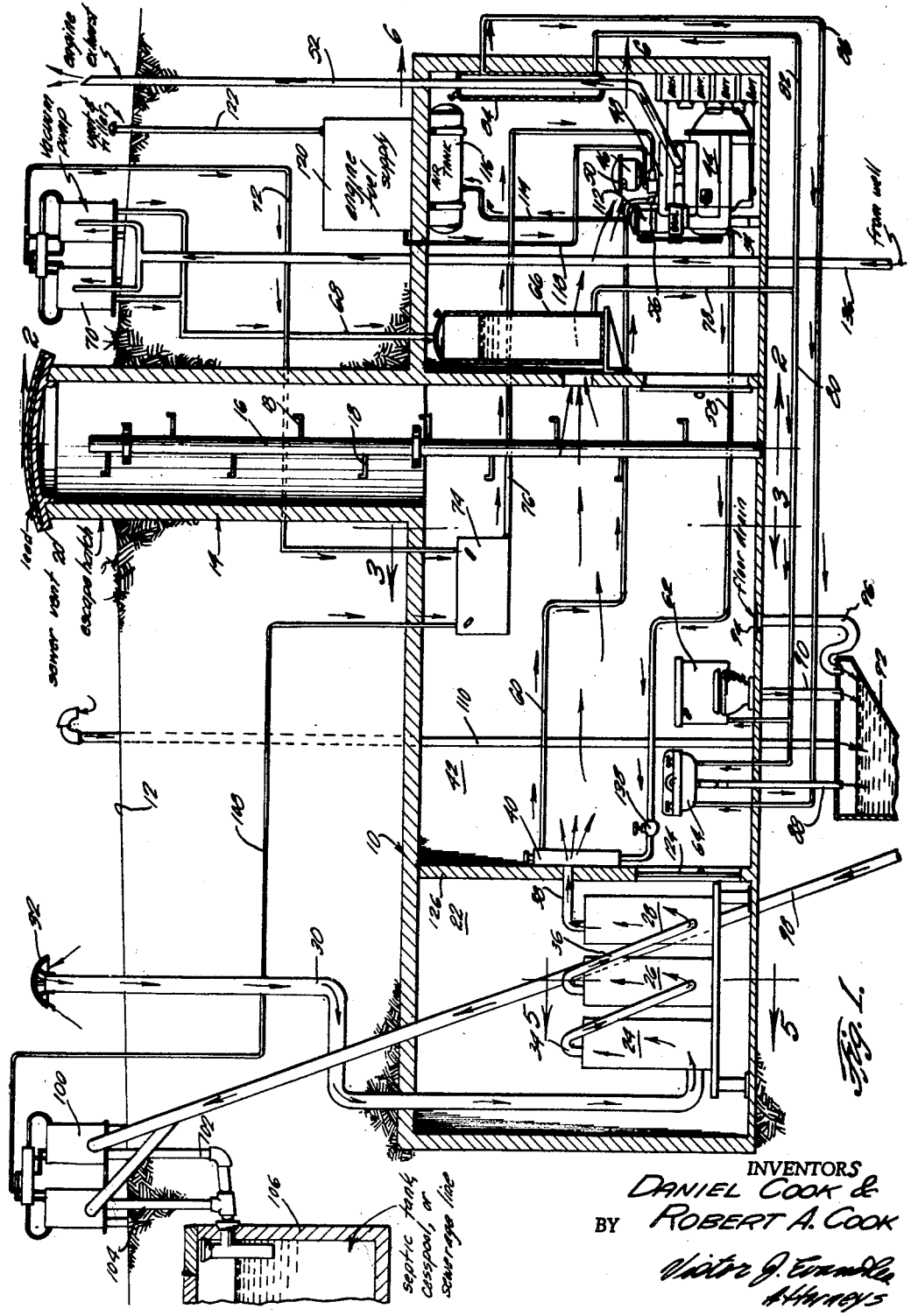

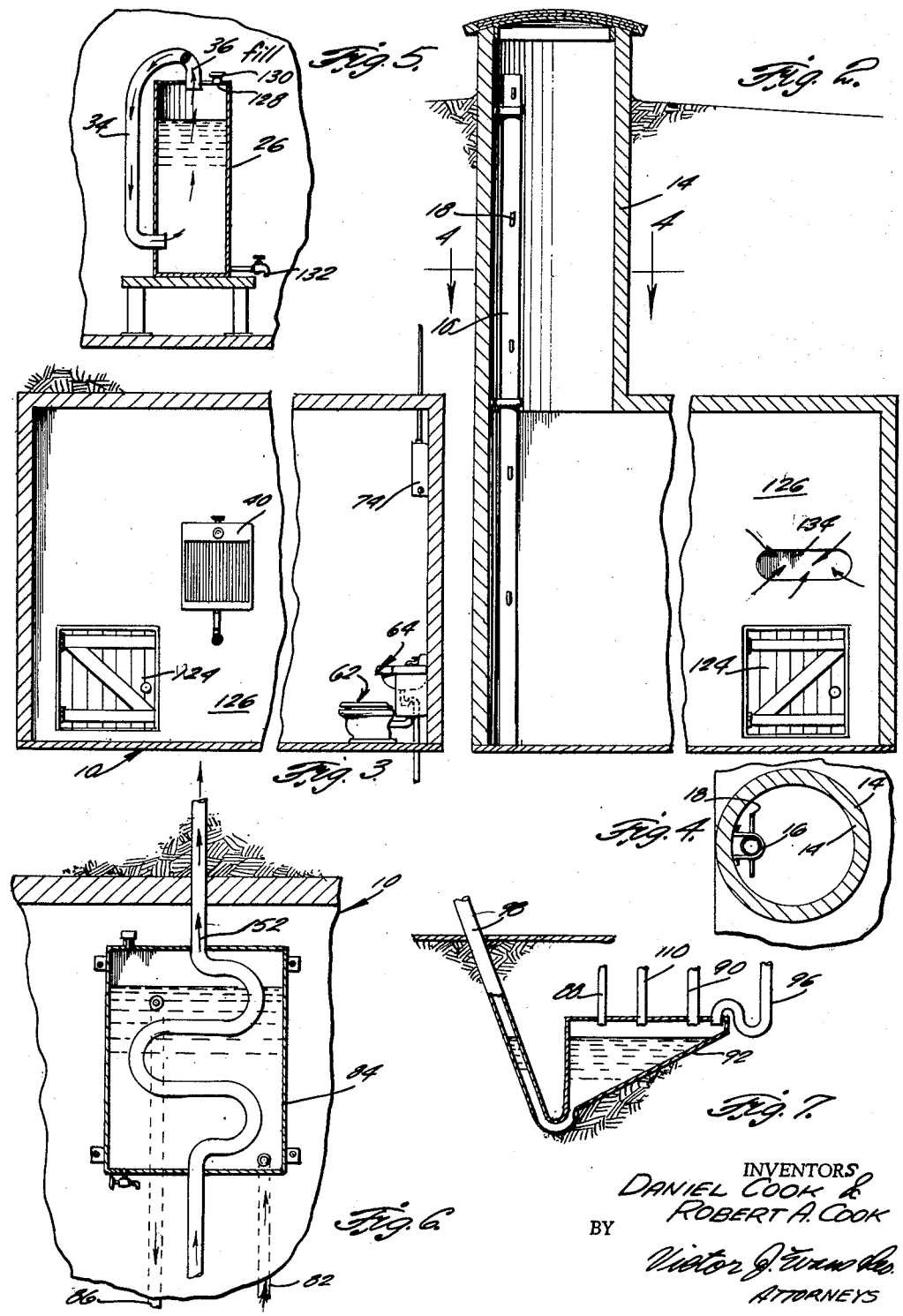

3,181,554
SHELTER AIR AND WASTE SYSTEM
Robert A. Cook, 2909 40th Ave., and Daniel Cook, 1611 24th Ave., both of Gulfport, Miss.
Filed Nov. 7, 1962, Ser. No. 235,948
2 Claims. (Cl. 137—357)

The present invention relates to bomb shelters generally and in particular to an air system and a waste system for such a shelter.

An object of the present invention is to provide a system for fresh air for a bomb shelter and to provide a system for disposing of the waste of the bomb shelter occupants.

Another object of the present invention is to provide, in a bomb shelter, a system for supplying hot water to the occupants of the bomb shelter for washing purposes.

A still further object of the present invention is to provide a fresh air system and waste disposal system for a bomb shelter which is simple in structure, one having a common means for operation thereof, such means embodying an internal combustion engine having an intake manifold and an intake for combustion air, and one which may be manufactured from conventional parts and assembled with ease and facility.

These other objects and advantages of the present invention will be fully apparent from the following description when taken in connection with the annexed drawings, in which:

FIGURE 1 is a view in section of a bomb shelter with the systems of the present invention installed therein, FIGURE 2 is a view taken on the line 2—2 of FIGURE 1, FIGURE 3 is a view taken on the line 3—3 of FIGURE 1, FIGURE 4 is a view taken on the line 4—4 of FIGURE 2, FIGURE 5 is a view on an enlarged scale, taken on the line 5—5 of FIGURE 1, FIGURE 6 is a view on an enlarged scale, taken on the line 6—6 of FIGURE 1, and FIGURE 7 is a fragmentary view of a portion of the apparatus shown in FIGURE 1.

With reference to the drawings in detail, and in which like numerals indicate like parts throughout the several views, the reference numeral 10 designates generally a bomb shelter of conventional construction and buried below the surface of the earth 12. The shelter 10 is provided with an upstanding entrance and escape hatch 14 in which there is a tubular support member 16 having steps 18 on the sides thereof and forming a ladder for use of the occupants of the shelter 10.

A cover 20 extends over the open upper end of the hatch 14 and seals it against entrance of air thereinto.

At one end of the shelter 10 is a separate room 22 in which there are three air-scrubbing tanks containing water or other solutions for cleaning air. The tanks are numbered 24, 26 and 28, respectively.

A conduit 30 has one end connecting in communication with the atmosphere and covered with a ring shield 32 and has the other end connecting in communication with the inlet to the tank 24.

The outlet of the tank 24 is connected by a conduit 34 to the inlet of the tank 26 and the outlet of the tank 26 is connected by another conduit 36 to the inlet of the tank 28.

The outlet of the tank 28 is connected by a conduit 38 to a radiator or heat exchange device 40 mounted on the wall of the main room 42 of the shelter 10.

At the end of the room 42 remote from the radiator 40 is an internal combustion engine 44 having an air cleaner 46 connected to the intake manifold 48 of the engine 44. The air cleaner 46 is provided with an air inlet 50 for admitting combustion air into the engine manifold 48.

The engine 44 has its exhaust pipe or conduit 52 open at one end and to the atmosphere above the ground level 12.

The engine 44 is provided with a water jacket for cooling (not shown) and the jacket is provided with an outlet 54 and an inlet 56. A conduit 58 connects the outlet of the jacket with the bottom or inlet of the radiator 40 and another conduit 60 connects the upper end of the radiator 40 with the inlet 56 of the water jacket of the engine 44.

Within the shelter 10 is a flush toilet 62 and a wash basin 64. Water is provided for this by means of a water tank 66 secured to the wall of the shelter 10 and having an inlet conduit 68 extending to above ground to the output side of a double barreled vacuum pump 70 which is the subject of a co-pending application No. 173,705, filed February 16, 1962 by one of the co-inventors of this present application.

The pump 70 is connected by a conduit 72, junction box 74 and another conduit 76 to the intake manifold 48 of the engine 44 for operation of the pump 70 by the vacuum in the manifold 48.

The outlet of the tank 66 is connected by a conduit 78 to a main conduit 80 leading to the cold water side of the wash basin 46 and leading to the tank of the flush tank toilet 62. Another conduit 82 connects the conduit 78 to a water tank or heater 84 mounted on the wall of the room 42. The exhaust pipe 52 extends through the heater 84 and gives up its heat to the water contained in the tank for circulation in the direction indicated by arrows from the top of the tank through another conduit 86 to the hot water side of the wash basin 64.

Sewer pipes 88 and 90 connect the wash basin and toilet 62 to an accumulation tank 92. The shelter room 42 is provided with a floor drain 94 connected by a conduit 96 to the accumulation tank 92.

As shown in FIGURE 7, the bottom of the tank 92 is connected by a conduit 98 to another fluid vacuum pump 100 mounted upon the ground surface. The output side of the pump 100 is connected by drains 102 and 104 to a septic tank 106. Instead of the septic tank 106 the drains 102 and 104 may be connected to the public sewer system if there is one in the vicinity.

The pump 100 is operatively connected by a conduit 108 to the box 74 in which there are suitable valves for selectively connecting the pump 70 to the manifold 48 or the pump 100 to the manifold 48 as desired.

A vent pipe 110 vents the accumulation tank 92 to atmosphere for the escape of sewage gases and inlet of air when the tank 92 is pumped out.

A conventional compressor for air 112 is operatively driven by the engine 44 and its output is connected by a conduit 114 to an air compressor tank 116 wherein air may be accumulated for emergency use in case the external air is not drawn into the room 42 by the means to be described.

The engine 44 is provided with its fuel through a conduit 118 which leads to a buried tank 120 having a filler pipe 122 extending above ground level.

There is an access door 124 in the wall 126 which separates the room 22 from the room 42.

As shown in FIGURE 5, the tank 26 is provided with a filler opening 128 closed by a cap 130. The tank 26 is also provided with a drain 132 by means of which the liquid contained in the tank for washing the air may be removed for replenishment.

The conduit 38 leading from the tank 28 conveys the air to an opening 134 in the wall 126 which is blocked on the other side by the radiator 40.

When the shelter 10 is to be occupied the fuel tank 120 is filled with fuel for the engine 44 and the tanks 24, 26, 28, are filled with suitable fluid for scrubbing the air that passes therethrough. With the engine 44 going either the pump 70 may be operated to draw water up through a conduit 136 from a deep well or the pump 100 may be operated to withdraw the accumulated waste in the tank 92.

The normal operation of the engine 44 will draw air from the room 42 for use as combustion air through the inlet 50 of the carburetor air cleaner 46. This air will be exhausted through the conduit 52 to the atmosphere after it has been mixed with fuel and the fuel burned in the engine.

The air flowing into the engine 44 through the inlet 50 is drawn through the room 52 from the radiator 40 which may be kept supplied with warm water from the water jacket of the engine 44, there being a valve 138 in the conduit 58 to serve as a heat regulator.

As the air is drawn through the conduit 38 into the radiator 40 it is drawn from the atmosphere under the rain shield 32 through the conduit 30 into the first tank 24 then through the conduit 34 into the second tank 26 and then through the conduit 36 into the third tank 28. The tank 66 serves as a storage tank for water drawn from the well and serves to supply water to the wash basin 64 and toilet 62.

It will be seen therefore that the engine 44 performs a dual function that of replenishing the air in the room 42 and also employing its vacuum to supply the shelter with fresh water and to remove from the shelter the accumulated waste in the tank 92.

While only a preferred embodiment of the present invention has been shown and described, other embodiments are contemplated and numerous changes and modifications may be made in the invention without departing from the spirit thereof.

What is claimed is:

1. In combination with an underground bomb shelter provided with an entrance and exit hatch and a sealing door closing said hatch, an air supply system comprising at least one air washing tank having an inlet for air and an outlet for air, a first conduit having one end connected in communication with the atmosphere and having the other end connected in communication with the inlet of said tank, a second conduit having one end connected in communication with the interior of said shelter and having the other end connected in communication with said tank outlet, an internal combustion engine having an inlet for combustion air disposed so that the air inlet is connected in communication with the interior of said shelter, said engine having the exhaust thereof connected in communication with the atmosphere, said engine including a water jacket provided with an inlet and an outlet, a radiator disposed in such shelter and being communicated with the inlet and outlet of the water jacket for circulation of water therethrough, said radiator being disposed in overlying relation to said second conduit which has one end communicated with the interior of the shelter whereby incoming air will pass through the radiator for heating the air and cooling the water in the radiator.

2. In combination with an underground bomb shelter provided with an entrance and an exit hatch and a sealing door closing said hatch, an air supply system comprising at least one air washing tank having an inlet for air and an outlet for air, a first conduit having one end connected in communication with the atmosphere and having the other end connected in communication with the inlet of said tank, a second conduit having one end connected in communication with the interior of said shelter and having the other end connected in communication with said tank outlet, an internal combustion engine having an intake manifold and having an inlet for combustion air connected to said intake manifold, and having a water jacket provided with an inlet and an outlet, said shelter being provided with a waste accumulation tank, and a vacuum pump operatively connected to said manifold and operable to pump waste when in said accumulation tank to a place of disposal exteriorly of said shelter, said engine being disposed so that the air inlet is connected in communication with the interior of said shelter, said engine having the exhaust thereof connected in communication with the atmosphere.

References Cited by the Examiner

UNITED STATES PATENTS 2,522,630 9/50 McCulloch _____ 285—236 X
3,074,080 1/63 Previti _____ 4—172

MARTIN P. SCHWADRON, *Acting Primary Examiner.*